(12) United States Patent
Park et al.

(10) Patent No.: US 7,562,277 B2
(45) Date of Patent: Jul. 14, 2009

(54) DATA TRANSMITTING/RECEIVING SYSTEM AND METHOD THEREOF

(75) Inventors: Jeong-hoon Park, Seoul (KR); Yung-Iyul Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 696 days.

(21) Appl. No.: 10/282,228

(22) Filed: Oct. 29, 2002

(65) Prior Publication Data

US 2003/0098992 A1    May 29, 2003

(30) Foreign Application Priority Data

Oct. 31, 2001    (KR) ............................... 2001-67309

(51) Int. Cl.
  *G08C 25/02*    (2006.01)
(52) U.S. Cl. .................. 714/748; 714/798; 714/791
(58) Field of Classification Search ............... 714/748, 714/48, 703, 712, 717, 791, 798
See application file for complete search history.

(56) References Cited

U.S. PATENT DOCUMENTS

| | | | |
|---|---|---|---|
| 6,085,252 A | 7/2000 | Zhu et al. | |
| 6,658,019 B1 | 12/2003 | Chen et al. | |
| 6,711,164 B1 * | 3/2004 | Le et al. | 370/392 |
| 6,748,000 B1 * | 6/2004 | Vainikainen et al. | 370/517 |
| 6,782,047 B1 * | 8/2004 | Le et al. | 375/240 |
| 6,788,707 B1 * | 9/2004 | Horton et al. | 370/474 |
| 7,010,032 B1 * | 3/2006 | Kikuchi et al. | 375/240.01 |
| 7,061,936 B2 * | 6/2006 | Yoshimura et al. | 370/474 |

FOREIGN PATENT DOCUMENTS

EP    0 735 774    10/1996

(Continued)

OTHER PUBLICATIONS

European Search Report issued Aug. 31, 2007 in corresponding European Patent Application No. 02257484.2-1237.

(Continued)

*Primary Examiner*—Esaw T Abraham
*Assistant Examiner*—Fritz Alphonse
(74) *Attorney, Agent, or Firm*—Staas & Halsey LLP

(57) ABSTRACT

A data transmitting/receiving system adds identifying information to a data packet based on characteristics of the data. The identifying information can be a data type of a payload data of an IP/UDP/RTP packet and/or a temporal data sequence of the payload data. The IP/UDP/RTP packet added with the identifying information is segmented into an IP/UDP/RTP header and IP/UDP/RTP data. The segmented IP/UDP/RTP header and the IP/UDP/RTP data can be transmitted through different channels. A receiver sends retransmission control information based on the added identifying information extracted by the receiver, the retransmission control information providing retransmission time and priority information. A transmitter retransmits reception error occurring IP/UDP/RTP data according to the retransmission control information received by the transmitter. Varying the retransmission times and/or retransmission priority based on the data characteristics, accommodates data retransmission so that data more influential to data restoration in case of loss/damage can be received more stably.

33 Claims, 7 Drawing Sheets

FOREIGN PATENT DOCUMENTS

| | | |
|---|---|---|
| EP | 0 736 979 | 10/1996 |
| EP | 0 996 248 | 4/2000 |
| EP | 1 006 689 | 6/2006 |
| JP | 2000-253380 | 9/2000 |
| JP | 2001-119437 | 4/2001 |
| TW | 444-506 | 7/2001 |

OTHER PUBLICATIONS

European Search Report issued Jun. 15, 2007 in corresponding European Patent Application No. 02257484.2-1237.

Office Action issued Oct. 19, 2004 from Japanese Patent Office with respect to co-pending Japanese Patent Application No. 2002-316687, filed Oct. 30, 2002.

* cited by examiner

| V | P | X | CC | M | PT | SEQUENCE NO. |
|---|---|---|----|---|----|--------------|
| TIMESTAMP ||||||||
| SSRC IDENTIFIER ||||||||
| CSRC IDENTIFIER ||||||||

| IP HEADER | UDP HEADER | UDP DATA |
|-----------|------------|----------|

| SEQ | CTL | DATA | TYPE |
|-----|-----|------|------|

DATA TRANSMITTING/RECEIVING SYSTEM AND METHOD THEREOF

CROSS-REFERENCE TO RELATED APPLICATIONS

This application claims the benefit of Korean Application No. 2001-67309 filed Oct. 31, 2001, in the Korean Intellectual Property Office, the disclosure of which is incorporated herein by reference.

BACKGROUND OF THE INVENTION

1. Field of the Invention

The present invention relates to a data transmitting/receiving system and method thereof, and more particularly, to a data transmitting/receiving system and method thereof that uses a real-time transmission protocol to control a retransmission of a packet that is damaged in the process of multimedia data transmission.

2. Description of the Related Art

Generally, data like moving picture data (video) and audio data, which require real-time transmission (streaming), are usually transmitted by a real-time transport protocol (RTP). The user datagram protocol (UDP) is specified by the IETF AVT (Internet Engineering Task Force Audio/Video Transport) Working Group, and the Request for Comment (RFC) 1889 specifies the RTP that is the transport protocol for transmitting real-time application data and a real-time transport control protocol (RTCP) for transmitting control information. However, RTP does not deal with contents about resource bookings, and more particularly, RTP does not provide services like timely data transmission, quality of service (QoS) guarantee, and prevention of non-orderly transmission. In other words, it can be said that the RTP is a standard that is focused on the real-time data transmission. Typically an RTP packet is transmitted on top of UDP.

FIG. 1 is a view showing the RTP packet. Referring to FIG. 1, a header of the RTP packet has a fixed size, and is followed by information and data. About the fields in the RTP packet header, briefly, a V field is a version field and a P field is used to construct a packet in 32-bit unit. An X field indicates as to whether the header will be expanded or not. A CC field refers to the number of contributing source identifier (CSRC). An M field indicates a frame region with respect to the multimedia information. Accordingly, the M field is used to distinguish information of the packet, like distinguishing audio information from image information, etc. A PT field refers to the format of the RTP payload of the profile defined by the RFC 1890, which is interpreted by an application program. A sequence number field indicates an order of the RTP packet. A 'timestamp' field indicates the point of time that the first octet is sampled. A synchronization source (SSRC) field refers to an identifier of data sources like a camera or a microphone. A CSRC field refers to identifiers that could identify sources of the RTP packet that is mixed in an intermediate system.

Positioned next to the RTP header is data formatted in a UDP packet. FIG. 2 shows the data format that is capsulated in the UDP format. Referring to FIG. 2, the UDP packet is comprised of an IP header, a UDP header and UDP data. In the IP header, addresses of data source and destination, upper layer protocol and check sum are recorded. Recorded in the UDP header are port numbers of the source and destination, sizes of the UDP header and the data, and UDP check sum. The UDP data is for transmission. The UDP header and the UDP data are collectively called a UDP datagram, and the IP header and the UDP datagram are collectively called an IP datagram. In other words, the RTP packet comprises the RTP header and the IP datagram (IP/UDP/RTP packet).

The RTP packet described with reference to FIGS. 1 and 2 can be transmitted through a wire, or wirelessly. In transmission, due to loss of some bits or damage to the data by noise or the like, sometimes some parts of or an entire RTP packet are improperly received at a receiving end. In this case, the receiving end analyzes the packet number of the incompletely received packet and requests the transmitting end for a retransmission.

Meanwhile, data transmission under mobile communication environment is carried out by a radio link protocol (RLP). FIG. 3 is a view showing the format of the RLP packet. Referring to FIG. 3, the RLP packet is comprised of a sequence field (SEQ), a control field (CTL), a data field (DATA), and a form field (TYPE). SEQ field indicates the order of the RLP packet. The CTL field can record functions, such as a password, a retransmission by NAK method, and the like. In the data field, data is recorded, and in the form field, the form of the data frame structure is recorded.

When supporting a data service in the CDMA mobile communication system, typically the RLP (IS-707.2) is used as the link layer between the mobile station and base station. Accordingly, to wirelessly transmit the RTP packet, the RTP packet is converted into the RLP packet. In the conventional RLP layer, only a password function and a selective NAK transmission function for the retransmission of wireless link frame exist.

However, wireless regions are typically exposed to high levels of noise influence, and there is also a high possibility of bursts in particular regions. Also, due to interferences with another wireless signal or due to multi-paths, possibilities of fading also exist. All of these cause a higher possibility of loss in the wireless region than in the wired regions. Also, wireless communication has a limited bandwidth for data transmission, and a high data transmission cost. In this respect, it is very critical that the size and volume of the transmitted data have to be reduced. Accordingly, appropriate controlling retransmission of damaged data plays a critical role, especially in wireless regions.

FIG. 4 is a view showing the process of data retransmission in the conventional data transmission system. Referring to FIG. 4, in the conventional data system 40, the transmitting end 44 transmits the RTP packet to the receiving end 42 upon a data transmission request by the receiving end 42. The receiving end 42 analyzes a RTP packet that has a reception error, and sends out a packet number of the error-containing RTP packet. For example, among the transmitted RTP packet Nos. 1~30, when packet numbers of the reception error-containing packets are 8, 9, 10, 16, the packet numbers of 8, 9, 10, 16 are sent to the transmitting end 44 with a retransmission request. The transmitting end 44 retransmits the RTP packets of requested packet numbers to the receiving end 42 according to predetermined retransmission times.

As described above, conventionally, retransmission of damaged packets was carried out by applying a standardized retransmission method with respect to all of the data, regardless of the transmission medium and bandwidth. That is, frequency of retransmission was predetermined and an erroneous packet was retransmitted according to such predetermined frequency, which does not consider multimedia data characteristics.

Regarding wireless data communication using RLP, in a transmission unit of RLP, data transmission is made between a mobile station, which is the wireless region, and a base station, which is a wired region. Typically in the mobile station, the RTP, UDP, IP regions (IP/UDP/RTP header) of an RTP packet is compressed. Then, the payload (e.g., multimedia data) and the compressed IP/UDP/RTP header are transmitted through (encapsulated by) the RLP as one unit. The receiving end 42 analyzes a packet number of a packet that contains a reception error and requests a retransmission. RLP is one of those conventional transmission methods that do not consider characteristics of the data, and the retransmission times are set at the beginning of the transmission. If the receiving end 42 requests retransmission, the transmitting end 44 accepts the request if the request is below the pre-set retransmission times, but ignores the request if the request exceeds the pre-set retransmission times.

In the conventional data transmitting/receiving systems, a retransmission is carried out regardless of the characteristics of the data. Therefore, the retransmission-requested data cannot restore damaged data in a uniform manner. Especially with respect to moving picture data coded according to MPEG, which is comprised of Intra picture and Inter picture, restoration quality of the respective pictures tend to vary. Even with respect to pictures of a same kind, restoration of the data may vary according to (be affected by) sequences of data (i.e., a temporal data sequence). Accordingly, there is a need to control retransmission to reflect characteristics of the data.

SUMMARY OF THE INVENTION

An object of the present invention is to provide a data transmitting/receiving system and a method thereof that transmits a data packet together with data characteristic information, for an efficient data retransmission.

Another object of the present invention is to provide a data transmitting/receiving system and a method thereof controlling data retransmission based on characteristics of the data.

Yet another object of the present invention is to provide a data transmitting/receiving system and a method thereof performing data retransmission based on characteristics of the data damaged during transmission.

Additional objects and advantages of the invention will be set forth in part in the description which follows and, in part, will be obvious from the description, or may be learned by practice of the invention.

The present invention may be achieved by a data transmitting/receiving system comprising an identifying data generation unit adding identifying data to an IP/UDP/RTP packet (i.e., RTP packet), the identifying data being generated based on data information from an IP/UDP/RTP header of the IP/UDP/RTP packet and the identifying data comprises a data type of payload data of the IP/UDP/RTP packet and/or a temporal data sequence of the payload data; a packet segmentation unit segmenting the IP/UDP/RTP packet added with identifying data into an IP/UDP/RTP header and IP/UDP/RTP data; a communication unit transmitting the segmented IP/UDP/RTP header and the IP/UDP/RTP data, and receiving retransmission control information; and a retransmission unit retransmitting reception error occurring IP/UDP/RTP data according to the retransmission control information.

According to an aspect of the invention, the identifying data generation unit adds the identifying data to a UDP header of the IP/UDP/RTP header. The data type of the payload data is one of an intra picture and an inter picture. With respect to the intra picture, the identifying data generation unit adds the identifying data which is at a higher priority than a priority specified by the added identifying data for the inter picture. Further, the identifying data generation unit adds the identifying data having/specifying a priority according to the temporal data sequence.

According to an aspect of the invention, further provided is a packet converter converting the IP/UDP/RTP packet into a radio link protocol (RLP) packet (i.e., an RLP packet encapsulating an RTP packet). Further provided is a header compression unit compressing the IP/UDP/RTP header.

According to an aspect of the invention, the IP/UDP/RTP header and the IP/UDP/RTP data are transmitted to different channels, respectively. In particular, the IP/UDP/RTP header and the IP/UDP/RTP data are transmitted in the RLP packet to the different channels, respectively. Further, the channel transmitting the IP/UDP/RTP header has a lower transmission error rate than the channel transmitting the IP/UDP/RTP data.

According to an aspect of the invention, the retransmission control information includes a packet number of reception error occurring IP/UDP/RTP data, and retransmission times information. Further, when the retransmission unit receives the retransmission control information, the retransmission unit retransmits the IP/UDP/RTP data corresponding to the packet number of the IP/UDP/RTP data according to received retransmission times information and/or other pre-set/determined retransmission times for the IP/UDP/RTP data.

According to an aspect of the invention, further provided is a monitor monitoring a status of the channel where the IP/UDP/RTP data is transmitted, wherein, when the status of the channel transmitting the IP/UDP/RTP data is below a lowest threshold, the retransmission unit retransmits each IP/UDP/RTP data according to lower retransmission times (e.g., a lower number of/less frequent retransmissions) than pre-set retransmission times for the IP/UDP/RTP data. Conversely, when the status of the channel transmitting the IP/UDP/RTP data is above a highest threshold, the retransmission unit retransmits the IP/UDP/RTP according to higher retransmission times (e.g., a higher number of/more frequent retransmissions) than the pre-set retransmission times.

According to an aspect of the invention, the retransmission control information includes a packet number of the reception error occurring IP/UDP/RTP and a retransmission priority. Further, when the retransmission unit receives the retransmission control information, the retransmission unit retransmits the IP/UDP/RTP data, for which the retransmission is requested, according to the received retransmission priority and/or according to other pre-set/determined retransmission priority.

According to an aspect of the invention, further provided is a monitor monitoring a status of a channel where the IP/UDP/RTP data is transmitted, wherein, when the status of the channel transmitting the IP/UDP/RTP data is below a lowest threshold, the retransmission unit retransmits the IP/UDP/RTP data according to a lower retransmission priority than a pre-set retransmission priority. Further, when the status of the channel transmitting the IP/UDP/RTP data is above a highest threshold, the retransmission unit retransmits the IP/UDP/RTP data according to a higher retransmission priority than the preset retransmission priority (e.g., two times or more higher).

Further, according to another aspect of the present invention, a data transmitting/receiving method comprises generating an IP/UDP/RTP packet which is added with identifying data, the identifying data being generated from a data type of payload data of the IP/UDP/RTP packet and/or a temporal data sequence of the payload; and segmenting the IP/UDP/RTP packet added with the identifying data into an IP/UDP/RTP header and IP/UDP/RTP data and transmitting the segmented IP/UDP/RTP header and the IP/UDP/RTP data.

According to an aspect of the invention, the identifying data is added to a UDP header of the IP/UDP/RTP header. The payload data is either an intra picture or an inter picture. With respect to the intra picture, the added identifying data specifies a higher priority than a priority specified by the added identifying data for the inter picture. Further, the identifying data specifies a priority according to the temporal data sequence.

According to an aspect of the invention, the IP/UDP/RTP header and the IP/UDP/RTP data are transmitted in a radio link protocol (RLP) packet.

According to an aspect of the invention, the method further comprises compressing the IP/UDP/RTP header, prior to the transmitting. Further, the method comprises receiving a retransmission control information; and retransmitting transmission error occurring IP/UDP/RTP data according to the retransmission control information.

According to an aspect of the invention, the retransmission control information includes a packet number of transmission error occurring IP/UDP/RTP data and retransmission times information. The retransmission comprises retransmitting the IP/UDP/RTP data corresponding to the packet number according to the received retransmission times information and/or other pre-set/determined retransmission times for the IP/UDP/RTP data.

According to an aspect of the invention, the retransmission control information includes a packet number of transmission error occurring IP/UDP/RTP data and a retransmission priority. The retransmission comprises retransmitting the IP/UDP/RTP data corresponding to the packet number according to the received retransmission priority and/or according to other pre-set/determined retransmission priority.

According to an aspect of the invention, the IP/UDP/RTP header and the IP/UDP/RTP data are transmitted in an RLP packet to different channels, respectively. The channels are wireless channels, and the channel transmitting the IP/UDP/RTP header has a lower transmission error rate than the channel transmitting the IP/UDP/RTP data.

According to an aspect of the invention, the retransmission control information includes the packet number of the transmission error occurring IP/UDP/RTP data and the retransmission times information, wherein, when a status of the channel transmitting the IP/UDP/RTP data is below a lowest threshold, each IP/UDP/RTP data is retransmitted according to lower retransmission times (e.g., a lower number of/less frequent) than pre-set retransmission times for the IP/UDP/RTP data. Conversely, when the status of the channel transmitting the IP/UDP/RTP data is above a highest threshold, the IP/UDP/RTP data is retransmitted according to higher retransmission times (e.g., a higher number/more frequent retransmissions) than the pre-set retransmission times.

According to an aspect of the invention, the retransmission control information includes the packet number of transmission error occurring IP/UDP/RTP data and the retransmission priority, wherein, when a status of the channel transmitting the IP/UDP/RTP data is below a lowest threshold, the IP/UDP/RTP data is retransmitted according to a lower retransmission priority than a pre-set retransmission priority. Further, when the status of the channel transmitting the IP/UDP/RTP data is above a highest threshold, the IP/UDP/RTP data is retransmitted according to a higher retransmission priority than the pre-set retransmission priority (e.g., two times or more higher).

Further, according to another aspect of the present invention, a data receiving system comprises a communication unit receiving an IP/UDP/RTP header and IP/UDP/RTP data, and transmitting retransmission control information; and a retransmission controller extracting identifying data when there occurs a reception error in the IP/UDP/RTP data and transmitting the retransmission control information which is generated based on the extracted identifying data, the extracted identifying data being generated based upon data information from the IP/UDP/RTP header that includes a data type of payload data of the IP/UDP/RTP data and/or a temporal data sequence of the payload data.

According to an aspect of the invention, the retransmission controller comprises a check unit checking whether there is a reception error in the IP/UDP/RTP data corresponding to the received IP/UDP/RTP header; an identifying data extract unit extracting the identifying data from the IP/UDP/RTP header corresponding to the reception error occurring IP/UDP/RTP data; and a retransmission controller generating retransmission control information according to the extracted identifying data.

According to an aspect of the invention, the retransmission control information includes a packet number of the reception error occurring IP/UDP/RTP data and retransmission times information. Further, the retransmission control information includes a packet number of the reception error occurring IP/UDP/RTP data and a retransmission priority.

According to an aspect of the invention, the IP/UDP/RTP header and the IP/UDP/RTP data are received in an RLP packet through different channels, respectively.

According to another aspect of the present invention, a data receiving method comprises receiving an IP/UDP/RTP header and IP/UDP/RTP data; confirming a reception error in the IP/UDP/RTP data; extracting identifying data, which is generated based on data information from the IP/UDP/RTP header corresponding to the reception error occurring IP/UDP/RTP data, and includes a data type of payload data of the IP/UDP/RTP data and/or a temporal data sequence of the payload data; generating retransmission control information based on the extracted identifying data; and transmitting the generated retransmission control information.

According to an aspect of the invention, the retransmission control information includes a packet number of the IP/UDP/RTP data and retransmission times information. Further, the retransmission control information includes a packet number of the reception error occurring IP/UDP/RTP data and a transmission priority.

According to an aspect of the invention, the IP/UDP/RTP header and the IP/UDP/RTP data are received in an RLP packet from different channels, respectively.

According to another aspect of the present invention, a data transmitting/receiving system comprises a data transmission unit transmitting an IP/UDP/RTP header having identifying data about payload data of IP/UDP/RTP data corresponding to the IP/UDP/RTP header, and transmitting the IP/UDP/RTP data; and a data reception unit receiving the IP/UDP/RTP header and the IP/UDP/RTP data, and when the IP/UDP/RTP data is not received, the data reception unit extracts the identifying data from the received IP/UDP/RTP header and outputs retransmission control information according to the extracted identifying data.

According to an aspect of the invention, the data transmission unit includes an identifying data generation unit adding identifying data to an IP/UDP/RTP packet, the identifying data being generated based on data information from the IP/UDP/RTP packet that includes a data type of payload data of the IP/UDP/RTP packet and/or a temporal data sequence of the payload data; a packet segmentation unit segmenting the IP/UDP/RTP packet added with the identifying data into the IP/UDP/RTP header and IP/UDP/RTP data; a communication unit transmitting the separated IP/UDP/RTP header and the IP/UDP/RTP data, and receiving retransmission control information; and a retransmission unit retransmitting the reception error occurring IP/UDP/RTP data according to the retransmission control information.

According to an aspect of the invention, the identifying data generation unit adds the identifying data to a UDP header of the IP/UDP/RTP header.

According to an aspect of the invention, the payload data is either an intra picture or an inter picture. With respect to the intra picture, the identifying data generation unit adds an identifying data specifying a higher priority than a priority specified by an identifying data added for the inter picture. Further, the identifying data generation unit adds an identifying data having a priority according to the temporal data sequence.

According to an aspect of the invention, the IP/UDP/RTP header and the IP/UDP/RTP data are transmitted in a radio link protocol (RLP) packet.

According to an aspect of the invention, the data transmission unit further comprises a header compression unit compressing the IP/UDP/RTP header.

According to an aspect of the invention, the data reception unit comprises a communication unit receiving an IP/UDP/RTP header and IP/UDP/RTP data, and transmitting retransmission control information; and a retransmission controller extracting identifying data when there is a reception error in the IP/UDP/RTP data and outputting the retransmission control information generated based on the extracted identifying data, the extracted identifying data being generated based on data information from the received IP/UDP/RTP header that includes a data type of payload data and/or a temporal data sequence.

According to an aspect of the invention, the retransmission controller comprises a check unit checking a reception error in the IP/UDP/RTP data corresponding to the received IP/UDP/RTP header; an identifying data extracting unit extracting the identifying data from the IP/UDP/RTP header corresponding to the reception error occurring IP/UDP/RTP data; and a retransmission control information generation unit generating retransmission control information according to the extracted identifying data.

According to an aspect of the invention, the IP/UDP/RTP header and the IP/UDP/RTP data are transmitted in the RLP packet to different channels, respectively. The channels are wireless channels, and the channel transmitting the IP/UDP/RTP header has a lower transmission error rate than the channel transmitting the IP/UDP/RTP data.

According to an aspect of the invention, the retransmission control information includes a packet number of the reception error occurring IP/UDP/RTP data and retransmission times information. The data transmission unit further comprises a monitor unit monitoring a status of the channel where the IP/UDP/RTP data is transmitted, wherein, when the status of the channel, where the IP/UDP/RTP data is transmitted, is below a lowest threshold, the data transmission unit retransmits each IP/UDP/RTP data according to lower retransmission times (e.g., a lower number of/less frequent retransmissions) than pre-set retransmission times for the IP/UDP/RTP data. Conversely, when the status of the channel transmitting the IP/UDP/RTP data is above a highest threshold, the data transmission unit retransmits the IP/UDP/RTP data according to higher retransmission times (e.g., a higher number of/more frequent retransmissions) than the pre-set retransmission times.

According to an aspect of the invention, the retransmission control information includes a packet number of the reception error occurring IP/UDP/RTP data and a retransmission priority. The data transmission unit further comprises a monitor monitoring a status of a channel where the IP/UDP/RTP data is transmitted, wherein, when the status of the channel transmitting the IP/UDP/RTP data is below a lowest threshold, the data transmission unit retransmits the IP/UDP/RTP data according to a lower retransmission priority than a pre-set retransmission priority. When the status of the channel transmitting the IP/UDP/RTP data is above a highest threshold, the data transmission unit retransmits the IP/UDP/RTP data according to a higher retransmission priority than the pre-set retransmission priority (e.g., two times or more higher).

According to an aspect of the invention, the retransmission control information includes a packet number of the reception error occurring IP/UDP/RTP data and retransmission information, wherein, the retransmission information is either retransmission times or a retransmission priority.

According to an aspect of the invention, when the data transmission unit receives the retransmission control information, the data transmission unit retransmits the IP/UDP/RTP data, for which the retransmission is requested, according to the retransmission control information as frequently as the retransmission times. In an aspect of the invention, when the data transmission unit receives the retransmission information, the data transmission unit retransmits the IP/UDP/RTP data, for which retransmission is requested, according to the retransmission control information and according to the retransmission priority.

Further, according to another aspect of the present invention, a data transmitting/receiving method comprises transmitting an IP/UDP/RTP header having identifying data about payload data of IP/UDP/RTP data corresponding to the IP/UDP/RTP header and also transmitting IP/UDP/RTP data; and receiving the IP/UDP/RTP header and the IP/UDP/RTP data, and when a reception error occurs in the IP/UDP/RTP data, extracting the identifying data from the received IP/UDP/RTP header, and outputting retransmission control information generated according to the extracted identifying data.

According to an aspect of the invention, the transmitting comprises generating an IP/UDP/RTP packet added with identifying data, the identifying data being generated based on data information from the IP/UPD/RTP packet that includes a data type of the payload data of the IP/UDP/RTP packet and/or a temporal data sequence of the payload data; and segmenting the IP/UDP/RTP packet added with the identifying data into an IP/UDP/RTP header and IP/UDP/RTP data and transmitting the separated IP/UDP/RTP header and the IP/UDP/RTP data.

According to an aspect of the invention, the identifying data is added to a UDP header of the IP/UDP/RTP header.

According to an aspect of the invention, the payload data is either an intra picture or an inter picture. With respect to the intra picture, the identifying data added to for the intra picture specifies a higher priority than a priority specified by identifying data added for the inter picture. Further, the identifying data specifies a priority according to the temporal data sequence.

According to an aspect of the invention, the method further comprises compressing the IP/UDP/RTP header, prior to the segmenting.

According to an aspect of the invention, the IP/UDP/RTP header and the IP/UDP/RTP data are transmitted in a radio link protocol (RLP) packet. Further, the IP/UDP/RTP header and the IP/UDP/RTP data are transmitted in the RLP packet to different channels, respectively. The channels are wireless channels, and the channel transmitting the IP/UDP/RTP header has a lower transmission error rate than the channel transmitting the IP/UDP/RTP data.

According to an aspect of the invention, the receiving comprises receiving the IP/UDP/RTP header and the IP/UDP/RTP data; checking a reception error of the IP/UDP/RTP data; extracting the identifying data, which is generated based on data information from the IP/UDP/RTP header, which corresponds to the reception error occurring IP/UDP/RTP data, and includes the data type of the payload data and/or the temporal data sequence; generating retransmission control information based on the extracted identifying data; and transmitting the generated retransmission control information.

According to an aspect of the invention, the retransmission control information includes a packet number of the reception error occurring IP/UDP/RTP data and retransmission times information.

According to an aspect of the invention, the method further comprises retransmitting the IP/UDP/RTP data, for which the retransmission is requested, according to the retransmission control information as frequently as the retransmission times. When a status of the channel transmitting the IP/UDP/RTP data is below a lowest threshold, the each IP/UDP/RTP data is retransmitted according to lower retransmission times (e.g., a lower number of/less frequent retransmissions) than pre-set retransmission times for the IP/UDP/RTP data. Conversely, when the status of the channel transmitting the IP/UDP/RTP data is above a highest threshold, the IP/UDP/RTP data is retransmitted according to higher retransmission times (e.g., a higher number of/more frequent retransmissions) than the pre-set retransmission times.

According to an aspect of the invention, the retransmission control information includes a packet number of the reception error occurring IP/UDP/RTP data and a retransmission priority.

According to an aspect of the invention, the method further comprises retransmitting the IP/UDP/RTP data, for which the retransmission is requested, according to the retransmission control information and according to the received retransmission priority and/or other pre-set/determined retransmission priority for each IP/UDP/RTP data.

According to an aspect of the invention, when the status of the channel transmitting the IP/UDP/RTP data is determined to be below a lowest threshold as a result of monitoring the channel status, the IP/UDP/RTP data is retransmitted according to a lower priority than a pre-set retransmission priority. Conversely, when the status of the channel transmitting the IP/UDP/RTP data is above a highest threshold, the IP/UDP/RTP is retransmitted according to a higher priority than the pre-set retransmission priority (e.g., two or more times higher).

Accordingly, by varying frequency and/or priority of retransmissions based on characteristics of transmitted data, retransmission can be appropriately carried out (controlled) with respect to the characteristics of the data so that the data that is more influential/important/critical to restoration in case of damage/loss can be transmitted and received more stably (reliably).

BRIEF DESCRIPTION OF THE DRAWINGS

These and other objects and advantages of the present invention will be more apparent by describing the preferred embodiments of the present invention by referring to the appended drawings, in which.

DETAILED DESCRIPTION OF THE PREFERRED EMBODIMENTS

Figures 1, 2, 3, 4:
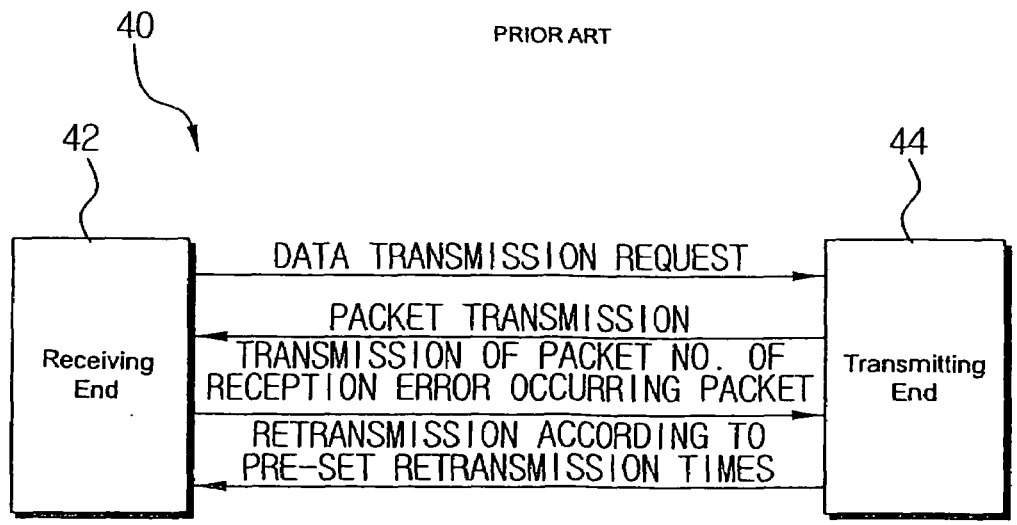
FIG. 1 is a view showing the structure of an RTP packet.
FIG. 2 is a view showing the format of an UDP capsulated data.
FIG. 3 is a view showing the format of an RLP packet.
FIG. 4 is a view showing the process of data retransmission in a conventional data transmitting system.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
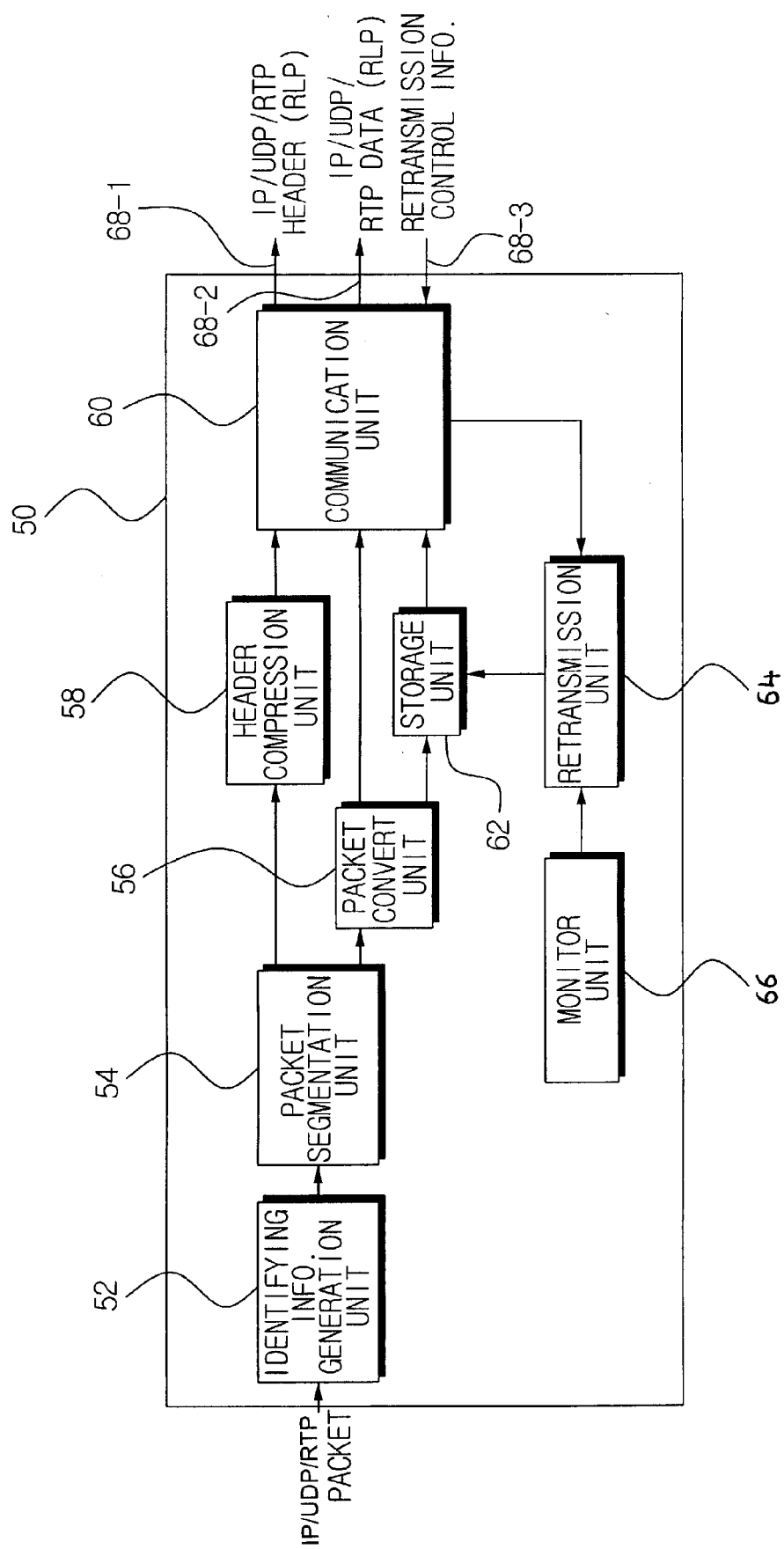
FIG. 5 is a block diagram of a data transmitting apparatus according to an embodiment of the present invention.

FIG. 5 is a block diagram of a data transmitting apparatus according to an embodiment of the present invention. In FIG. 5, the data transmitting apparatus 50 includes an identifying information generation unit 52, a packet segmentation unit 54, a packet conversion unit 56, a header compression unit 58, a communication unit 60, a storage unit 62, a retransmission unit 64, and a monitor unit 66.

In FIG. 5, the identifying information generation unit 52 extracts identifying information from an RTP header of an IP/UDP/RTP header structure of an IP/UDP/RTP packet received from outside. The identifying information according to the present invention provides (specifies) characteristics of a multimedia (video/audio) data packet used in real-time (streaming) multimedia applications. For example, the characteristics can be a data type of payload data of the IP/UDP/RTP packet and/or a temporal data sequence of the payload data of the IP/UDP/RTP packet. The operation of the identifying information generation unit 52 will be described below with reference to a case where the payload data specifies moving picture data (video) coded by the MPEG method.

Typically, the picture data coded according to MPEG is comprised of an intra picture that excludes other pictures and an inter picture that is constructed in consideration of a previous picture and/or a next picture of the coded picture. The inter picture is constructed by a temporal order. In the MPEG picture, the intra picture is restorable by itself, and accordingly, the intra picture serves as a reference in a random access, and inserted at regular intervals. Accordingly, in the MPEG picture, the intra picture plays a more important role than the inter picture does. With respect to the inter picture, pictures constructed earlier have higher importance than pictures constructed later.

The identifying information generation unit 52 analyzes the payload data from the received IP/UDP/RTP packet and determines a data type (characteristic) of the payload data. In other words, the identifying information generation unit 52 analyzes the payload data to determine whether the payload data is an intra picture or an inter picture (i.e., determine characteristics of the payload data). Also, the identifying information generation unit 52 analyzes an order of construction if the payload data is the inter picture. According to the payload data type and/or the temporal sequence as determined, the identifying information generation unit 52 adds, respectively, defined identifying information to the IP/UDP/RTP header. The identifying information can have a form of number '1' for intra picture, and number '2' for inter picture, for example. Accordingly, in this example, the identifying information '2N' would indicate the inter picture of Nth order. In other words, by adding identifying information like 2a, 2b, . . . , 2n with respect to the inter picture, the order of picture generation is indicated. The identifying information can be added to a UDP header of the IP/UDP/RTP header. However, the identifying information can also be added to any nonuse area of an IP header or the RPT header of the IP/UDP/RTP header of the IP/UDP/RTP packet.

The packet segmentation unit 54 divides the IP/UDP/RTP packet into an IP/UDP/RTP header and IP/UDP/RTP data. By doing this, the IP/UDP/RTP header, which contains critical information about the IP/UDP/RTP packet, can be transmitted through a more stable channel. Especially in next generation wireless communication systems (technologies), like IMT2000, a data packet is transmitted and received according to the present invention in a separated form of header and data through separate channels for a more efficient data transmission/reception. The header is, of course, transmitted and received through the more stable channel than the channel transmitting and receiving data.

The packet conversion unit 56 converts the IP/UDP/RTP data into a radio link protocol (RLP) packet. The packet conversion unit 56 is provided in case of data transmission/reception in wireless communication environments. In case of wireless communication, data is transmitted in the RLP unit, which is a transmission unit for a radio link layer (RLL), between a wireless mobile station and a base station. Meanwhile, the packet conversion unit 56 can also be provided in the communication unit 60.

The header compression unit 58 compresses the IP/UDP/RTP header. Generally, in the header of the IP/UDP/RTP packet transmitted from a particular source to a particular destination, the same information is repeatedly written. For example, information like destination address and source address of the IP/UDP/RTP header are written repeatedly. Accordingly, after initial transmission of the IP/UDP/RTP header, by excluding repeated portions of the IP/UDP/RTP header, or by adding identifying information to the repeated portions, the data can be compressed to reduce transmission load.

The IP/UDP/RTP data divided by the packet segmentation unit 56 is stored in the storage unit 62. The IP/UDP/RTP data stored in the storage unit 62 is read upon receipt of a retransmission request from a receiving end (not shown), to retransmit the requested IP/UDP/RTP data to the receiving end.

The communication unit 60 transmits the IP/UDP/RTP header and the IP/UDP/RTP data, and receives retransmission control information. Meanwhile, in wireless communication environments, the IP/UDP/RTP data formatted in the RLP packet (encapsulated in the RPL packet) is transmitted to the receiving end. When the IP/UDP/RTP header and the IP/UDP/RTP data are transmitted through different t selected channels (68-1 and 68-2), respectively, the selected channel 68-1 transmitting the IP/UDP/RTP header is more stable than the selected channel 68-2 transmitting the IP/UDP/RTP data.

The retransmission control information can be transmitted through a separate channel 68-3.

The retransmission unit 64 retransmits the IP/UDP/RTP data according to the received retransmission control information. The retransmission control information typically includes a packet number of the reception error occurring IP/UDP/RTP data and retransmission information. Reception errors by the receiving end can be, for example, non-reception of an IP/UDP/RTP data and/or reception of an IP/UDP/RTP data with damaged bits. The retransmission information is set by the receiving end and can be based on control numbers, typically retransmission times, retransmission priority, etc. The retransmission unit 64 analyzes the packet number of the reception error occurring IP/UDP/RTP data and retransmits the retransmission requested IP/UDP/RTP data according to the identifying data and/or other pre-set retransmission information, such as retransmission times and priority.

The monitor unit 66 monitors a status of the channel through which the IP/UDP/RTP data is transmitted. After the monitoring by the monitor unit 66, the channel status is input to the retransmission unit 64. If the channel status falls within a range between lower and upper thresholds, the retransmission unit 64 carries out retransmission according to the received retransmission control information. If the channel status is below the lower threshold, and if the retransmission control information contains the packet number of the reception error occurring IP/UDP/RTP data and retransmission times for the packet number, the retransmission unit 64 first retransmits the IP/UDP/RRP data with lower retransmission times than pre-set/determined retransmission times. If the channel status is above the upper threshold, the retransmission unit 64 first retransmits the IP/UDP/RTP data with higher retransmission times (e.g., a higher number of/more frequent retransmissions) than the pre-set/determined retransmission times).

Meanwhile, if the received retransmission control information includes the packet number of the reception error occurring IP/UDP/RTP data and the retransmission priority of the packet number, and if the channel status is determined to be below the lower threshold, the retransmission unit 64 first retransmits the IP/UDP/RTP data with a lower retransmission priority than a pre-set/determined retransmission priority. If the channel status is above the upper threshold, the retransmission unit 64 first retransmits the IP/UDP/RTP data with a higher retransmission priority than the pre-set/determined retransmission priority, for example, as often as two or more times higher. Therefore, based on a status of the IP/UDP/RTP data (RLP) channel 68-2, the retransmission unit 64 prioritizes in-queue retransmissions according to the retransmission time information or the retransmission priority information of the IP/UDP/RTP data.

Figure 6:
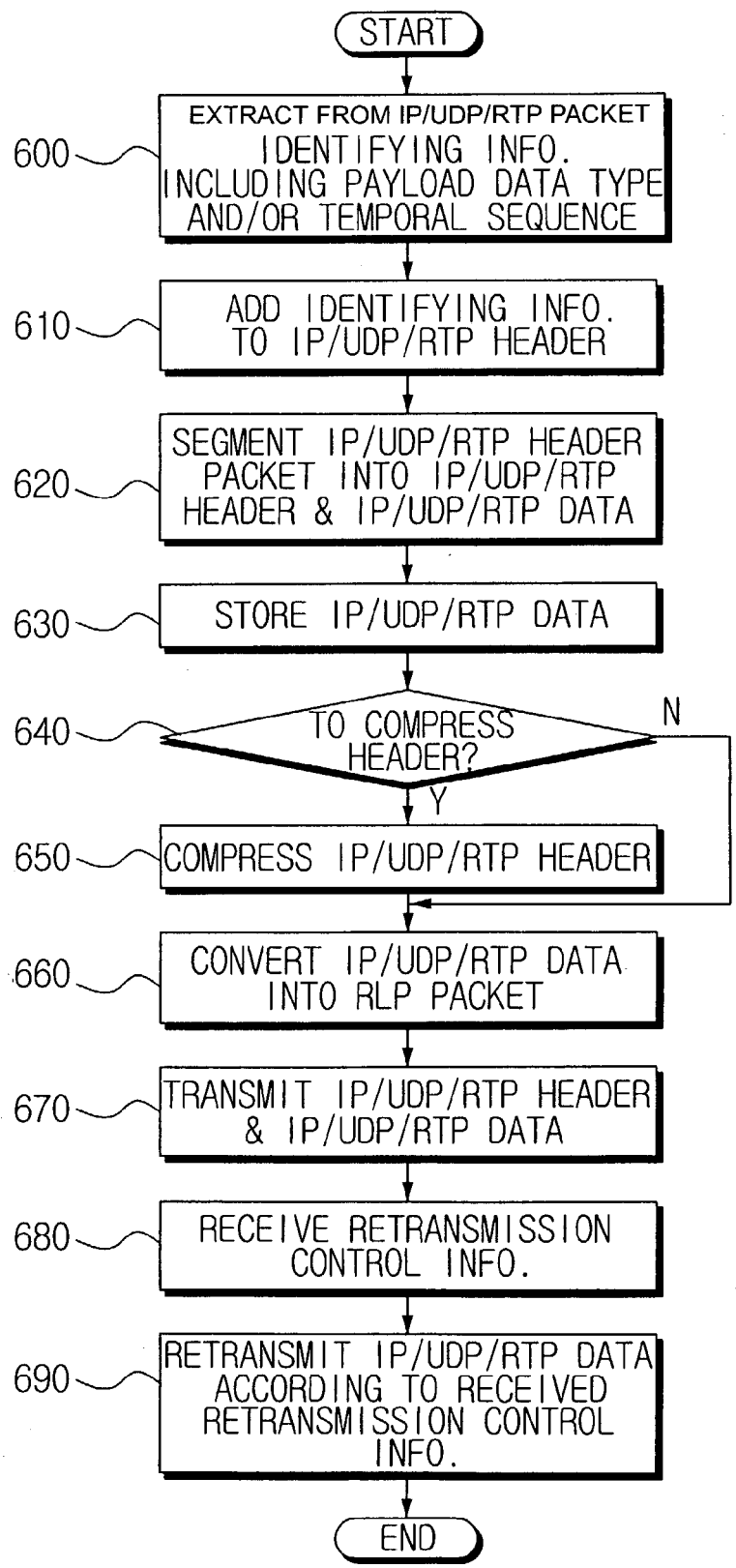
FIG. 6 is a flowchart of data transmission according to an embodiment of the present invention.

FIG. 6 is a flowchart of data transmission according to an embodiment of the present invention. Referring to FIG. 6, at operation 600 the identifying information generation unit 52 extracts identifying information from the RTP header of an IP/UDP/RTP header structure of an IP/UDP/RTP packet received from outside. The identifying information includes the data type of the payload data and/or the temporal data sequence. Based on the type of the payload data and/or the temporal sequence as analyzed, at operation 610 the identifying information generation unit 52 adds the respectively defined identifying information to the IP/UDP/RTP header.

At operation 620, the packet segmentation unit 54 divides the IP/UDP/RTP packet into the IP/UDP/RTP header and the IP/UDP/RTP data. The packet segmentation unit transmits the IP/UDP/RTP header, which contains more important information, to a more stable channel. Especially in the next generation wireless communication systems (technologies), like IMT2000, for more efficient data transmission and reception, the data packet is divided into the header and the data segments and the header and the data are separately transmitted and received. The selected channel, where the header with more important information is transmitted, is more stable than the selected channel where the data is transmitted.

At operation 630, after being divided by the packet segmentation unit 56, the IP/UDP/RTP data is stored in the storage unit 62. Upon request from the receiving end, the IP/UDP/RTP data stored in the storage unit 62 is read and used for retransmission.

At operation 650, the header compression unit 58 compresses the divided IP/UDP/RTP header, if at operation 640 header compression is set for transmission.

At operation 660, the packet conversion unit 56 converts the IP/UDP/RTP data into a radio link protocol (RLP) packet. The packet conversion unit 56 is provided for data transmission/reception under the wireless communication environments.

At operation 670, the communication unit 60 transmits the IP/UDP/RTP header and the IP/UDP/RTP data. At operation 680, when the retransmission unit 64 receives retransmission control information from the receiving end after the IP/UDP/RTP header and the IP/UDP/RTP data are transmitted, at operation 690 the retransmission unit 64 retransmits the IP/UDP/RTP data according to the retransmission control information as received.

Figure 7:
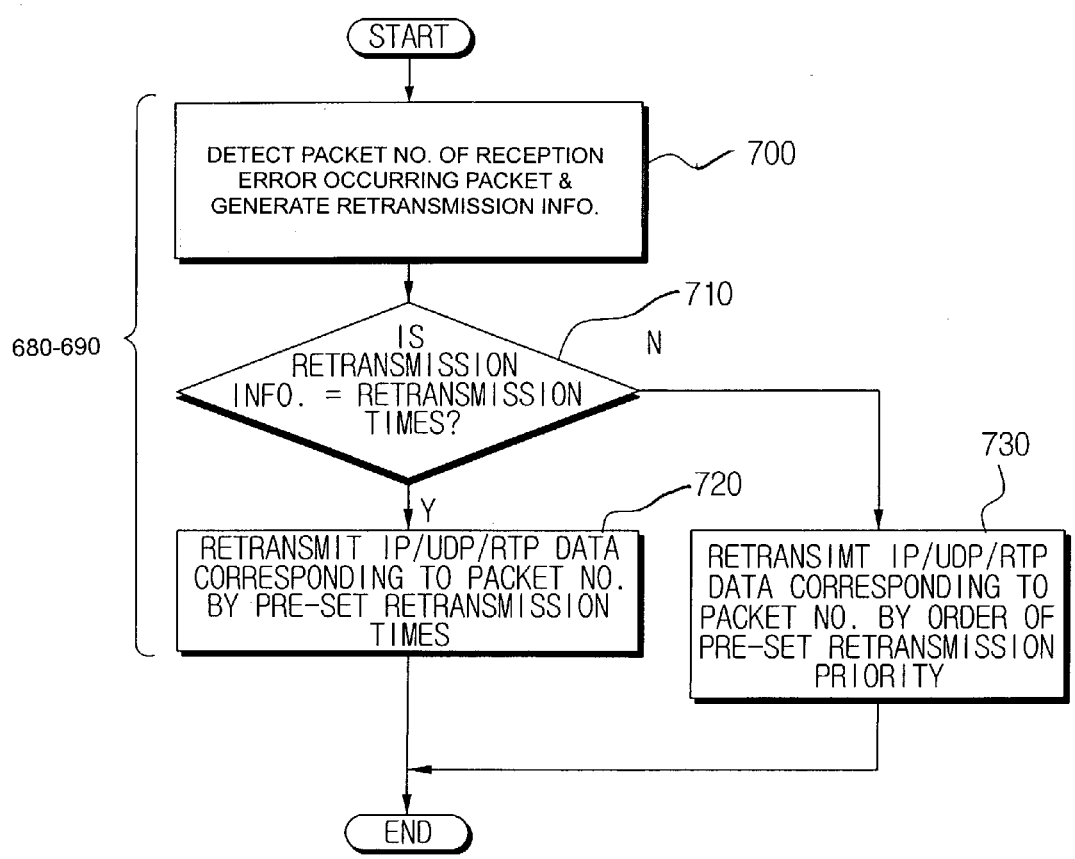
FIG. 7 is a flowchart of a retransmission process according to retransmission control information, according to an embodiment of the present invention.

FIG. 7 is a flowchart of a retransmission process according to the retransmission information included in the retransmission control information, according to an embodiment the present invention. Referring to FIGS. 6 and 7, when at operation 680 the retransmission control information is received through the communication unit 60 by a transmitting end, then at operation 700 the retransmission unit 64 detects the packet number of the IP/UDP/RTP data that has a reception error. The retransmission control information received by the transmitting end can include retransmission information of retransmission times and priority. At operation 710, the retransmission unit 64 of the transmitting end determines whether the retransmission information received from the receiving end is retransmission times.

If at operation 710 the retransmission information is the retransmission times, at operation 720 the retransmission unit 64 retransmits the IP/UDP/RTP data corresponding to the packet number of the reception error occurring packet, by a pre-set/determined/received retransmission time. If at operation 710 the transmission information is the retransmission priority, at operation 730 the retransmission unit 64 retransmits the IP/UDP/RTP data corresponding to the packet number of the reception error occurring packet, according to a pre-set/determined retransmission priority.

Figure 8:
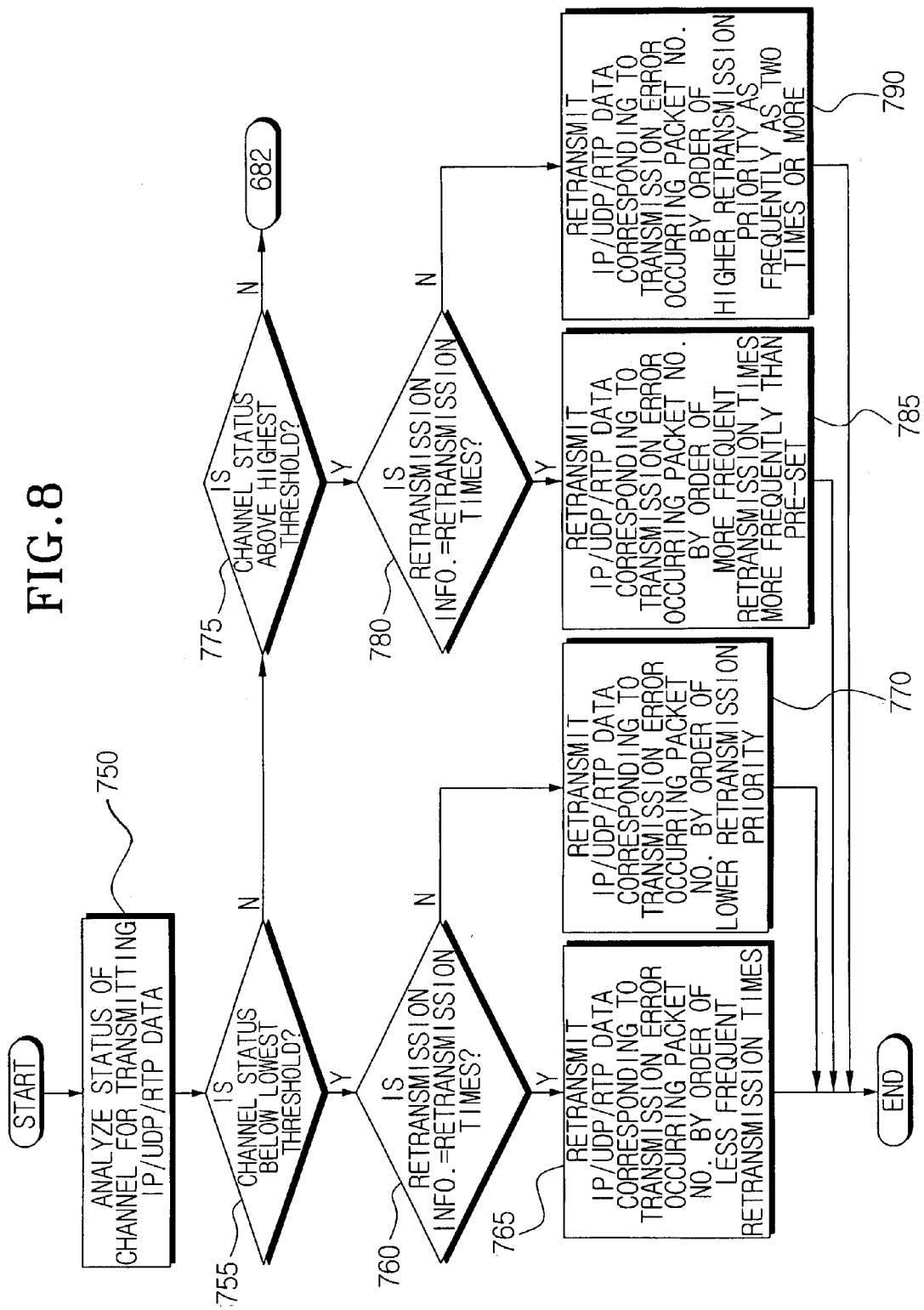
FIG. 8 is a flowchart of a retransmission process according to a channel status where IP/UDP/RTP data is transmitted, according to an embodiment of the present invention.

FIG. 8 is a flowchart of a retransmission process according to the status of the channel through which the IP/UDP/RTP data is transmitted, according to an embodiment of the present invention. Referring to FIGS. 6 and 8, at operation 680 when the retransmission control information is received through the communication unit 60, retransmission is carried out according to a status of the channel where the IP/UDP/RTP data is transmitted. At operation 750, the monitor unit 66 analyzes the status of the channel where the IP/UDP/RTP data is transmitted, and outputs a channel status value to the retransmission unit 64. If at operation 755 the channel status is below a lower threshold, at operation 760 the retransmission unit 64 determines whether the retransmission information included in the received retransmission control information is the retransmission times.

If at operation 760 the retransmission information is the retransmission times, at operation 765 the retransmission unit 64 first retransmits the IP/UDP/RTP data corresponding to the packet number of the transmission error occurring packets according to a lower retransmission time (e.g., a lower number of/less frequent retransmissions) than a pre-set retransmission time. If at operation 760 the retransmission information is the retransmission priority, at operation 770 the retransmission unit 64 first retransmits the IP/UDP/RTP data corresponding to the packet number of the transmission error occurring packets according to a lower retransmission priority than a pre-set retransmission time.

Meanwhile, if at operation 775 the status of the channel is above an upper threshold, at operation 780 the monitor unit 66 determines whether the retransmission information included in the received retransmission control information is the retransmission times.

If at operation 780 the retransmission information is determined to be the retransmission times, among the IP/UDP/RTP data corresponding to the packet numbers of the transmission error occurring packets, at operation 785 the retransmission unit 64 first retransmits the IP/UDP/RTP data according to a higher retransmission time (e.g., higher number of/more frequent retransmissions) than a pre-set retransmission time. If at operation 780 the retransmission information is determined to be the retransmission priority, among the IP/UDP/RTP data corresponding to the packet numbers of the transmission error occurring packets, the retransmission unit 64 first retransmits the IP/UDP/RTP data according to a higher retransmission priority than a pre-set retransmission priority (e.g. two or more times higher).

Figure 9:
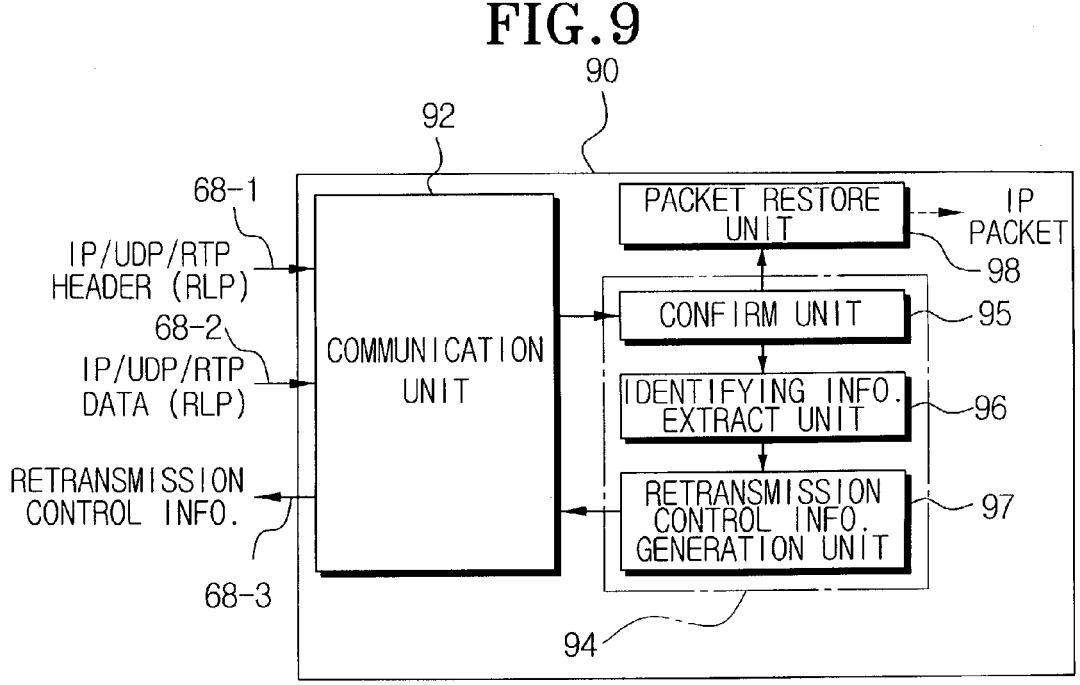
FIG. 9 is a block diagram of a data receiving apparatus according to an embodiment of the present invention.

FIG. 9 is a block diagram of the data receiving apparatus according to an embodiment of the present invention. Referring to FIG. 9, the data receiving apparatus 90 includes a communication unit 92, a retransmission control unit 94 and a packet restore unit 98.

In FIG. 9, the communication unit 92 receives the IP/UDP/RTP header and IP/UDP/RTP data through different channels (68-1 and 68-2) respectively. The communication unit 92 can also transmit retransmission control information through a separate channel 68-3. The channel 68-1 receiving the IP/UDP/RTP header is more stable than the channel 68-2 receiving the IP/UDP/RTP data.

If an error occurs in reception of the IP/UDP/RTP data, the retransmission control unit 94 extracts from the received IP/UDP/RTP header the added identifying information, and generates the retransmission control information based on the extracted identifying information. Here, the added identifying information includes the data type of the payload data and/or the temporal data sequence.

Further, the retransmission control unit 94 includes a confirm unit 95, an identifying information extract unit 96 and a retransmission control information generation unit 97. The confirm unit 95 confirms error occurrences in reception of IP/UDP/RTP data corresponding to received IP/UDP/RTP headers. The reception errors can include non-reception/loss of IP/UDP/RTP data and reception of IP/UDP/RTP data having some bits damaged.

The identifying information generation unit 96 extracts the added identifying information from the IP/UDP/RTP header corresponding to a reception error occurring IP/UDP/RTP data. The identifying information is generated in the data transmitting apparatus 50 of FIG. 5 based on data information from the IP/UDP/RTP packet. The identifying information includes a data type of the payload data in the IP/UDP/RTP header and/or a temporal data sequence.

According to the extracted identifying information, the retransmission control information generation unit 97 generates retransmission control information including a packet number and retransmission information of the reception error occurring IP/UDP/RTP data. The retransmission information includes retransmission times and/or retransmission priority, that are set according to the added identifying information indicating importance of the reception error occurring IP/UDP/RTP data. The generated retransmission control information is transmitted to the data transmitting apparatus 50 through the communication unit 92.

Meanwhile, the IP/UDP/RTP data having no reception error, is combined with the IP/UDP/RTP header corresponding to the IP/UDP/RTP data in the packet restore unit 98, thereby producing the IP/UDP/RTP packet. After being restored, the IP/UDP/RTP packet is used by the data receiving apparatus 90 or an external apparatus. If the payload data of the IP/UDP/RTP packet is an MPEG picture, the picture is decompressed and restored by the MPEG decoder and output through a display.

Figure 10:
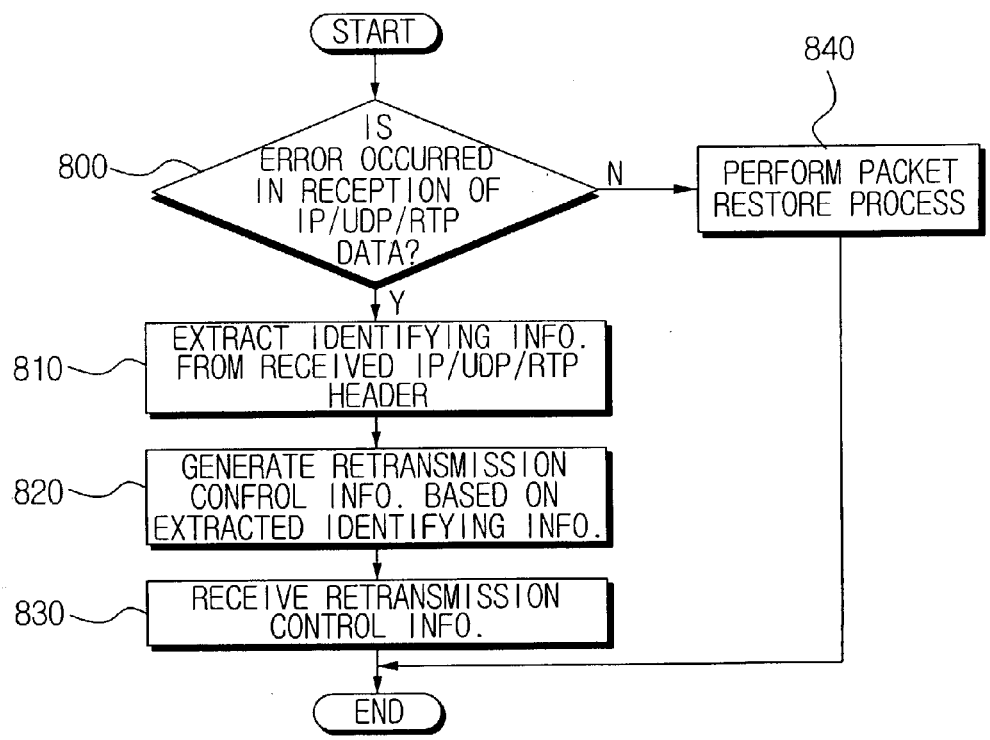
FIG. 10 is a flowchart of data reception according to an embodiment of the present invention.

FIG. 10 is a flowchart of a data receiving method according to an embodiment of the present invention. Referring to FIG. 10, at operation 800 when the IP/UDP/RTP header is received through the communication unit 92, the confirm unit 95 confirms occurrence of a reception error of an IP/UDP/RTP data corresponding to an IP/UDP/RTP header. If at operation 800 the IP/UDP/RTP data is confirmed to be received without an error, at operation 840 the packet restore unit 98 carries out a packet restore process.

If at operation 800 the occurrence of reception error is confirmed, at operation 810 the identifying information extract unit 96 extracts identifying information, which is added to the IP/UDP/RTP header by the transmitter 50, from the received IP/UDP/RTP header. At operation 820, the retransmission control information generation unit 97 generates the retransmission control information according to the extracted identifying information. The retransmission control information typically includes a packet number of the reception error occurring IP/UDP/RTP data and retransmission information. Also, the retransmission information typically includes retransmission times information and/or retransmission priority pre-set according to the added identifying information. At operation 830, the generated retransmission control information is transmitted to the data transmitting apparatus 50 through the communication unit 92.

Figure 11:
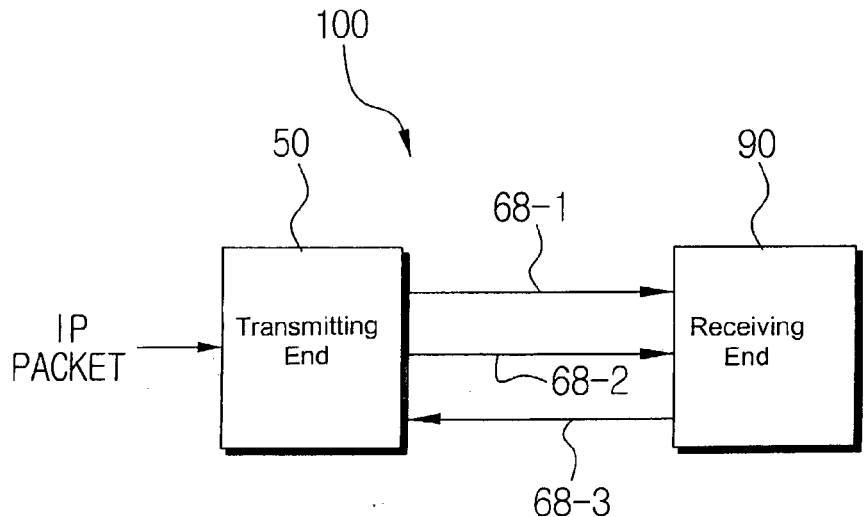
FIG. 11 is a block diagram of a data transmitting/receiving system according to an embodiment of the present invention.
Figure 12:
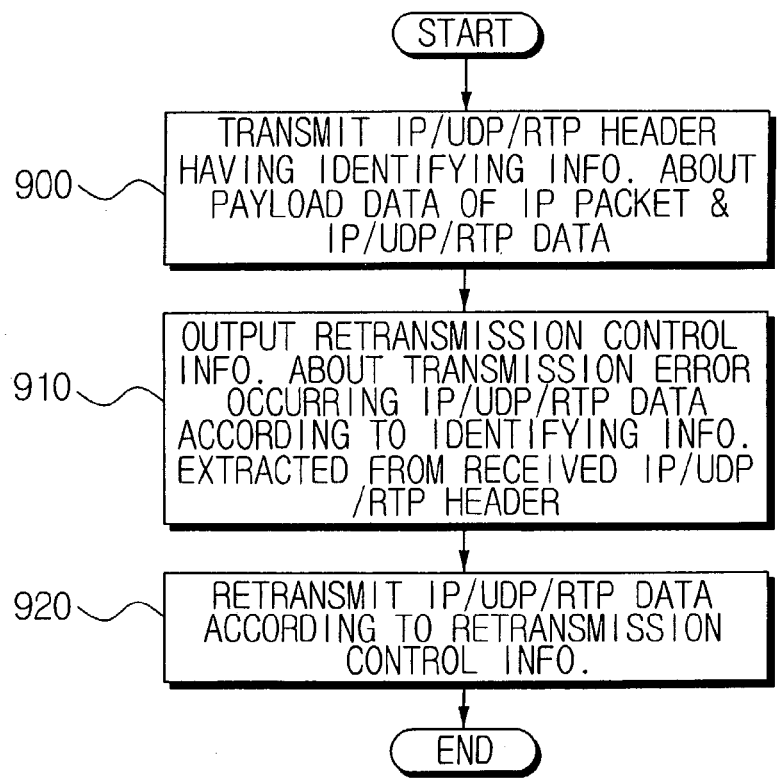
FIG. 12 is a flowchart of a data transmitting/receiving according to an embodiment of the present invention.

FIG. 11 is a block diagram of a data transmitting/receiving system according to an embodiment of the present invention, and FIG. 12 is a flowchart of a data transmitting/receiving method according to an embodiment of the present invention. Referring to FIGS. 11 and 12, the data transmitting/receiving system 100 according to the present invention includes a data transmitting unit 50 and a data receiving unit 90.

At operation 900, the data transmitting unit 50 transmits the IP/UDP/RTP header having the added identifying information about the payload data of the IP/UDP/RTP packet together with the IP/UDP/RTP data. At operation 910, the data receiving unit 90 receives the IP/UDP/RTP header and the IP/UDP/RTP data, and in the event of a reception error of the IP/UDP/RTP data, the data receiving unit 90 outputs retransmission control information according to the added identifying information extracted from the received IP/UDP/RTP header. Meanwhile, at operation 920 when the data transmitting unit 50 receives the retransmission control information from the data receiving unit 90, the data transmitting unit 50 retransmits the reception error occurring IP/UDP/RTP data according to the received retransmission control information.

Since the structure and operation of the data transmitting unit 50 and the data receiving unit 90 are identical to the structure and operation of the data transmitting unit 50 and the data receiving unit 90 described above with reference to FIGS. 5 and 9, the description thereof will be omitted. Likewise, since operations 910 through 930 are identical to the data transmitting method and the data receiving method described above with reference to FIGS. 6 through 8, and FIG. 10, the description thereof will also be omitted.

A data transmitting/receiving system according to the present invention adds identifying information to a data packet based on characteristics of the data. In case of multimedia (video/audio) data being transmitted over an IP network using RTP, the identifying information can be a data type of payload data of an IP/UDP/RTP packet and/or a temporal data sequence of the payload data. In case of transmitting an RTP packet wirelessly, the RTP packet is encapsulated in an RLP packet. Further, in case of wirelessly transmitting the RTP packet, the IP/UDP/RTP packet added with the identifying information can be segmented into an IP/UDP/RTP header and IP/UDP/RTP data, encapsulated in RLP packets, respectively, and transmitted through different channels, respectively. A receiver sends retransmission control information based on the added identifying information extracted by the receiver, the retransmission control information providing retransmission time and priority information. A transmitter retransmits reception error occurring IP/UDP/RTP data according to the retransmission control information received by the transmitter.

Although the above-described preferred embodiment of the present invention focused on the retransmission occurring during the data transmission and reception between the wireless terminal and the base station by compressing the IP/UDP/RTP header of the multimedia data, the present invention is not limited to such an embodiment and the data transmitting method and the data receiving method according to the present invention can also be applied to other protocols and/or wired communications (i.e., the present invention's processes of packet data characteristic addition, segmentation, compression, encapsulation, channel selection, transmission and retransmission according to the data characteristics, can be done with other communication protocol technologies. The processes of the invention to control retransmission responsive to data characteristics of lost/damages data can be embodied in software and/or hardware, for example, as part of networked data transmitter 50 and data receiver 90, using known techniques. In addition, those skilled in the art would easily note that the present invention could also be applied to a case of obtaining header information through par sing of the header data.

According to the data transmitting/receiving system of the present invention, by varying the retransmission times and retransmission priority according to the characteristics of the transmitted data, retransmission based on the characteristics of the data becomes possible and the data that is more influential/important to data restoration can be more stably received. Further, by varying the retransmission times and retransmission priority based on the status of the channel that transmits the data, the channel utilization is maximized, and the reception error occurring data can be effectively retransmitted. Also, by using a protocol stack that compresses and restores the data header, more efficient use of the channel is guaranteed during the data transmission and retransmission.

Although the preferred embodiment of the present invention has been described for illustrative purposes, those skilled in the art will appreciate that various modifications, additions and substitutions are possible, without departing from the scope and spirit of the invention, the scope of which is defined in the claims and their equivalents.

What is claimed is:

1. A data transmitting/receiving system, comprising:
 an identifying data generator generating identifying data based on an Internet Protocol/User Datagram Protocol/Real-Time Transport Protocol (IP/UDP/RTP) packet and adding the identifying data to the IP/UDP/RTP packet, the identifying data comprising a data type of payload data of the IP/UDP/RTP packet and/or a temporal data sequence of the payload data;
 a packet divider segmenting the IP/UDP/RTP data added with identifying data into an IP/UDP/RTP header and IP/UDP/RTP data;
 a communication unit transmitting the segmented IP/UDP/RTP header and the IP/UDP/RTP data, and receiving retransmission control information; and
 a retransmission unit retransmitting reception error occurring IP/UDP/RTP data according to the received retransmission control information,
 wherein the IP/UDP/RTP header and the IP/UDP/RTP data are transmitted to different channels, respectively.

2. The data transmitting/receiving system of claim 1, wherein the identifying data generator adds the identifying data to a UDP header of the IP/UDP/RTP header.

3. The data transmitting/receiving system of claim 1, wherein the type of the payload data is one of an intra picture and an inter picture.

4. The data transmitting/receiving system of claim 3, wherein, with respect to the intra picture, the identifying data added by the identifying data generator specifies a higher priority than a priority specified by the identifying data added for the inter picture.

5. The data transmitting/receiving system of claim 1, wherein the identifying data generator adds the identifying data specifying a priority according to the temporal data sequence.

6. The data transmitting/receiving system of claim 1, further comprising a packet converter converting the IP/UDP/RTP data into a radio link protocol (RLP) packet.

7. The data transmitting/receiving system of claim 1, further comprising a header compression unit compressing the IP/UDP/RTP header.

8. The data transmitting/receiving system of claim 1, wherein the channel transmitting the IP/UDP/RTP header has a lower transmission error rate than the channel transmitting the IP/UDP/RTP data.

9. A data transmitting/receiving system, comprising:
 an identifying data generator generating identifying data based on an Internet Protocol/User Datagram Protocol/Real-Time Transport Protocol (IP/UDP/RTP) packet and adding the identifying data to the IP/UDP/RTP packet, the identifying data comprising a data type of payload data of the IP/UDP/RTP packet and/or a temporal data sequence of the payload data;
 a packet divider segmenting the IP/UDP/RTP data added with identifying data into an IP/UDP/RTP header and IP/UDP/RTP data;
 a communication unit transmitting the segmented IP/UDP/RTP header and the IP/UDP/RTP data, and receiving retransmission control information; and
 a retransmission unit retransmitting reception error occurring IP/UDP/RTP data according to the received retransmission control information,
 wherein the retransmission control information comprises a packet number of reception error occurring IP/UDP/RTP data and retransmission times information.

10. The data transmitting/receiving system of claim 9, wherein, when the retransmission unit receives the retransmission control information, the retransmission unit retransmits the IP/UDP/RTP data corresponding to the packet number of the IP/UDP/RTP data according to the received retransmission times information of each IP/UDP/RTP data, respectively.

11. A data transmitting/receiving system, comprising:
 an identifying data generator generating identifying data based on an Internet Protocol/User Datagram Protocol/Real-Time Transport Protocol (IP/UDP/RTP) packet and adding the identifying data to the IP/UDP/RTP packet, the identifying data comprising a data type of payload data of the IP/UDP/RTP packet and/or a temporal data sequence of the payload data;
 a packet divider segmenting the IP/UDP/RTP data added with identifying data into an IP/UDP/RTP header and IP/UDP/RTP data;
 a communication unit transmitting the segmented IP/UDP/RTP header and the IP/UDP/RTP data, and receiving retransmission control information;
 a retransmission unit retransmitting reception error occurring IP/UDP/RTP data according to the received retransmission control information; and
 a monitor monitoring a status of a channel where the IP/UDP/RTP data is transmitted,
 wherein when the status of the channel transmitting the IP/UDP/RTP data is below a lowest threshold, the retransmission unit retransmits the IP/UDP/RTP data according to lower retransmission times than pre-set retransmission times.

12. The data transmitting/receiving system of claim 11, wherein, when the status of the channel transmitting the IP/UDP/RTP data is above a highest threshold, the retransmission unit retransmits the IP/UDP/RTP data according to higher retransmission times than the pre-set retransmission times.

13. A data transmitting/receiving system, comprising:
 an identifying data generator generating identifying data based on an Internet Protocol/User Datagram Protocol/Real-Time Transport Protocol (IP/UDP/RTP) packet and adding the identifying data to the IP/UDP/RTP packet, the identifying data comprising a data type of payload data of the IP/UDP/RTP packet and/or a temporal data sequence of the payload data;
 a packet divider segmenting the IP/UDP/RTP data added with identifying data into an IP/UDP/RTP header and IP/UDP/RTP data;
 a communication unit transmitting the segmented IP/UDP/RTP header and the IP/UDP/RTP data, and receiving retransmission control information; and
 a retransmission unit retransmitting reception error occurring IP/UDP/RTP data according to the received retransmission control information,
 wherein the retransmission control information includes a packet number of the reception error occurring IP/UDP/RTP and a retransmission priority.

14. The data transmitting/receiving system of claim 13, wherein, when the retransmission unit receives the retransmission control information, the retransmission unit retransmits the IP/UDP/RTP data, for which the retransmission is requested, according to the received retransmission control information and according to the received retransmission priority.

15. The data transmitting/receiving system of claim 13, further comprising a monitor monitoring a status of a channel where the IP/UDP/RTP data is transmitted, wherein, when the status of the channel transmitting the IP/UDP/RTP data is below a lowest threshold, the retransmission unit retransmits the IP/UDP/RTP data according to a lower retransmission priority than the received retransmission priority.

16. The data transmitting/receiving system of claim 15, wherein, when the status of the channel for transmitting the IP/UDP/RTP data is above a highest threshold, the retransmission unit retransmits the IP/UDP/RTP data according to a retransmission priority two times or more higher than the received retransmission priority.

17. A data transmitting/receiving method, comprising:
generating an Internet Protocol/User Datagram Protocol/Real-Time Transport Protocol (IP/UDP/RTP) packet with added identifying data, the identifying data comprises a data type of payload data of the IP/UDP/RTP packet and/or a temporal data sequence of the payload data;
segmenting the IP/UDP/RTP packet added with the identifying data into an IP/UDP/RTP header and IP/UDP/RTP data;
transmitting the segmented IP/UDP/RTP header and the IP/UDP/RTP data;
receiving a retransmission control information; and
retransmitting transmission error occurring IP/UDP/RTP data according to the retransmission control information.

18. The data transmitting/receiving method of claim 17, wherein the identifying data is added to a UDP header of the IP/UDP/RTP header.

19. The data transmitting/receiving method of claim 17, wherein the type of the payload data is either an intra picture or an inter picture.

20. The data transmitting/receiving method of claim 19, wherein, with respect to the intra picture, the added identifying data specifies a higher priority than a priority specified by the identifying data added for the inter picture.

21. The data transmitting/receiving method of claim 17, wherein the added identifying data specifies a priority according to the temporal data sequence.

22. The data transmitting/receiving method of claim 17, wherein the IP/UDP/RTP header and the IP/UDP/RTP data are transmitted in a radio link protocol (RLP) packet.

23. The data transmitting/receiving method of claim 17, further comprising compressing the IP/UDP/RTP header, prior to the transmitting.

24. The data transmitting/receiving method of claim 17, wherein the retransmission control information comprises a packet number of the transmission error occurring IP/UDP/RTP data and retransmission times.

25. The data transmitting/receiving method of claim 24, wherein the IP/UDP/RTP data corresponding to the packet number is retransmitted according to the received retransmission times.

26. The data transmitting/receiving method of claim 17, wherein the retransmission control information includes a packet number of the transmission error occurring IP/UDP/RTP data and a retransmission priority.

27. The data transmitting/receiving method of claim 26, wherein the IP/UDP/RTP data corresponding to the packet number is retransmitted according to the received retransmission priority.

28. The data transmitting/receiving method of claim 17, wherein the IP/UDP/RTP header and the IP/UDP/RTP data are transmitted to different channels, respectively.

29. The data transmitting/receiving method of claim 28, wherein the channels are wireless channels, and the channel transmitting the IP/UDP/RTP header has a lower transmission error rate than the channel transmitting the IP/UDP/RTP data.

30. The data transmitting/receiving method of claim 28, wherein the retransmission control information includes a packet number of the transmission error occurring IP/UDP/RTP data and retransmission times, wherein,
when a status of the channel transmitting the IP/UDP/RTP data is below a lowest threshold, the IP/UDP/RTP data is retransmitted according to lower retransmission times than the received retransmission times.

31. The data transmitting/receiving method of claim 30, wherein, when the status of the channel transmitting the IP/UDP/RTP data is above a highest threshold, the IP/UDP/RTP data is retransmitted according to higher retransmission times than the received retransmission times.

32. The data transmitting/receiving method of claim 28, wherein the retransmission control information includes a packet number of the transmission error occurring IP/UDP/RTP data and a retransmission priority, wherein,
when a status of the channel transmitting the IP/UDP/RTP data is below a lowest threshold, the IP/UDP/RTP data is retransmitted according to a lower retransmission priority than the received retransmission priority.

33. The data transmitting/receiving method of claim 32, wherein when the status of the channel transmitting the IP/UDP/RTP data is above a highest threshold, the IP/UDP/RTP data is retransmitted according to a retransmission priority two times or more higher than the received retransmission priority.

* * * * *